United States Patent
Li et al.

(10) Patent No.: US 12,340,447 B2
(45) Date of Patent: Jun. 24, 2025

(54) ENCRYPTION AND DECRYPTION SYSTEM AND METHOD

(71) Applicant: HON HAI PRECISION INDUSTRY CO., LTD., New Taipei (TW)

(72) Inventors: Yung-Hui Li, New Taipei (TW); Guo-Dong Su, New Taipei (TW); Kai-Lin Yang, New Taipei (TW); Muhammad Saqlain Aslam, New Taipei (TW); Yan-Jun Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 325 days.

(21) Appl. No.: 18/190,991

(22) Filed: Mar. 28, 2023

(65) Prior Publication Data

US 2023/0316611 A1    Oct. 5, 2023

Related U.S. Application Data

(60) Provisional application No. 63/362,049, filed on Mar. 29, 2022.

(51) Int. Cl.
*G06T 11/60* (2006.01)
*G06T 3/18* (2024.01)
(Continued)

(52) U.S. Cl.
CPC .............. *G06T 11/60* (2013.01); *G06T 3/18* (2024.01); *G06V 10/245* (2022.01); *G06V 10/44* (2022.01);
(Continued)

(58) Field of Classification Search
None
See application file for complete search history.

(56) References Cited

U.S. PATENT DOCUMENTS

| 8,548,164 B2 * | 10/2013 | Nourry | H04L 9/065 380/28 |
| 9,871,658 B2 * | 1/2018 | Myers | H04N 1/00 |
| 11,057,644 B2 * | 7/2021 | Horiuchi | G06F 21/84 |

OTHER PUBLICATIONS

Jiankang Deng et al., "ArcFace: Additive Angular Margin Loss for Deep Face Recognition", Version 4, Sep. 4, 2022, pp. 1-17. (https://arxiv.org/abs/1801.07698).

* cited by examiner

*Primary Examiner* — Yanna Wu
(74) *Attorney, Agent, or Firm* — CKC & Partners Co., LLC

(57) ABSTRACT

An encryption and decryption system is provided, which includes a transmitting device and a receiving device. The transmitting device is configured to store original images and a correspondence table. The receiving device is connected to the transmitting device for storing the correspondence table, wherein the transmitting device generates an encrypted string. The transmitting device selects a representative morphed image from multiple morphed images according to the encrypted string. The transmitting device transmits the representative morphed image to the receiving device and does not transmit the encrypted string to the receiving device. The receiving device recognizes the first original image serial number and the second original image serial number from the representative morphed image. The receiving device looks up the correspondence table according to the first original image serial number and the second original image serial number to generate the encrypted string.

18 Claims, 8 Drawing Sheets

(51) Int. Cl.
*G06V 10/24* (2022.01)
*G06V 10/44* (2022.01)
*G06V 10/82* (2022.01)
*H04L 9/08* (2006.01)

(52) U.S. Cl.
CPC ............ *G06V 10/82* (2022.01); *H04L 9/0816* (2013.01); *G06T 2210/44* (2013.01)

ENCRYPTION AND DECRYPTION SYSTEM AND METHOD

CROSS-REFERENCE TO RELATED APPLICATION

This application claims priority to U.S. Provisional Application Ser. No. 63/362,049, filed Mar. 29, 2022, which is herein incorporated by reference in its entirety.

BACKGROUND

Field of Invention

The present disclosure relates to an encryption and decryption system and method.

Description of Related Work

In the technical field of network encryption, complicated encryption algorithms or complex hash algorithms are needed to encrypt data. There are standard algorithms, including symmetric encryption algorithms and asymmetric encryption algorithms. These algorithms consume massive resources and time during calculation, or data capacity could be higher. In addition, these algorithms cannot guarantee data recovery after being attacked.

SUMMARY

The disclosure provides an encryption and decryption system. The encryption and decryption system comprises a transmitting device and a receiving device. The transmitting device comprises a first memory, a first processor, and a first transceiver circuit. The first memory is configured to store a plurality of original images. The first processor is configured to perform an image morphing process on the plurality of original images pairwisely to generate a plurality of morphed images. It also records a correspondence between serial numbers of the plurality of original images and serial numbers of the plurality of morphed images in a correspondence table stored in the first memory, wherein the first processor is configured to generate an encrypted string and select a representative morphed image from the plurality of morphed images according to the encrypted string. The first transceiver circuit is configured to transmit the representative morphed image and does not transmit the encrypted string. The receiving device is connected to the transmitting device. The receiving device comprises a second memory, a second transceiver circuit and a second processor. The second memory is configured to store the correspondence table. The second transceiver circuit is configured to receive the representative morphed image from the first transceiver circuit and does not receive the encrypted string. The second processor is configured to recognize a first original image serial number and a second original image serial number from the representative morphed image, and look up the correspondence table according to the first original image serial number and the second original image serial number to generate the encrypted string.

The disclosure further provides an encryption and decryption method. The encryption and decryption method comprises: generating an encrypted string, performing an image morphing process on a plurality of original images pairwisely to generate a plurality of morphed images, and recording a correspondence between serial numbers of the plurality of original images and serial numbers of the plurality of morphed images in a correspondence table; selecting a representative morphed image from the plurality of morphed images according to the encrypted string; transmitting the representative morphed image and does not transmit the encrypted string; in response to receiving the representative morphed image, recognizing a first original image serial number and a second original image serial number from the representative morphed image; and looking up the correspondence table according to the first original image serial number and the second original image serial number to generate the encrypted string.

It is to be understood that both the foregoing general description and the following detailed description are provided as examples, and are intended to provide further explanations of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
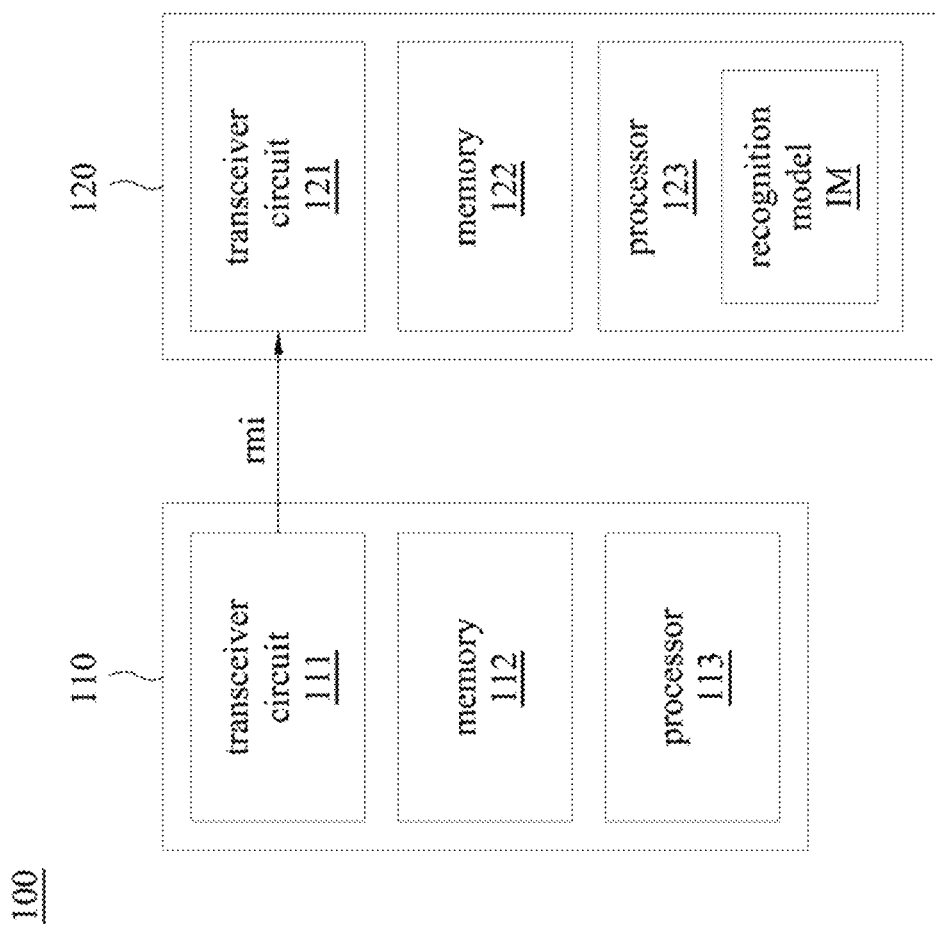
FIG. 1 is a block diagram illustrating an encryption and decryption system according to the present disclosure.

Reference will now be made in detail to the present embodiments of the disclosure, examples of which are illustrated in the accompanying drawings. Wherever possible, the same reference numbers are used in the drawings and the description to refer to the same or like parts.

In conventional encryption technology, complex data processes are needed to encrypt and decrypt data, resulting in wasted time and resources during the process. Also, for the conventional image encryption technology, suffers from problems such as excessive image distortion or low capacity of embedded data. Furthermore, there may be lack of ability to recover the encrypted data after an attack. In view of this, the present disclosure illustrates an encryption and decryption system and method, and the encryption and decryption system and method first generates massive morphed images from a few original images, and selects a representative morphed image (i.e., a corresponding morphed image) according to an encrypted string to transmit the representative morphed image from a transmitting device to a receiving device. Accordingly, the encryption and decryption system and method recognize serial numbers of the original images pairwisely from the representative morphed image, and look up a table according to the paired serial numbers of the original images to generate the encrypted string. Therefore, the problems of excessive image distortion or low capacity of embedded data can be solved, and the ability to recover the encrypted data can be improved.

Reference is made to FIG. 1. FIG. 1 is a block diagram illustrating an encryption and decryption system 100 according to the present disclosure. As shown in FIG. 1, the encryption and decryption system 100 comprises a transmitting device 110 and a receiving device 120. The transmitting device 110 is connected to the receiving device 120. In some embodiments, the transmitting device 110 and the receiving device 120 can be connected wirelessly or by wire.

In some embodiments, the transmitting device 110 and the receiving device 120 can be any electronic devices with communication function and process function (e.g., phones, laptops, or tablets). In some embodiments, the transmitting device 110 can comprise a transceiver circuit 111, a memory 112, and a processor 113, and the receiving device 120 can comprise a transceiver circuit 121, a memory 122, and a processor 123.

In this embodiment, the memory 112 pre-stores a plurality of original images, wherein the processor 113 performs an image morphing process on the plurality of original images pairwisely to generate a plurality of representative morphed image, and records a correspondence between the serial numbers of the plurality of original images and serial numbers of the plurality of morphed images in a correspondence table, wherein the correspondence table is stored in the memory 112. Also, the memory 122 stores the correspondence table. It is noticed that, the generation of the morphed images and the correspondence table will be discussed in the following paragraphs.

In this embodiment, the transceiver circuit 111 transmits the representative morphed image rmi to the transceiver circuit 121.

In some embodiments, the transceiver circuit 111 and the transceiver circuit 121 can be implemented by a communication interface (e.g., Wi-Fi communication interface) configured to communicate with other devices or systems. In some embodiments, the transceiver circuit 111 can transmit the representative morphed image rmi to the transceiver circuit 121. It is noticed that, selections of the representative morphed image rmi will be discussed in the following paragraphs.

In some embodiments, the memory 112 and the memory 122 can be implemented by memory units, flash memories, read-only memories, hard drives, or any other storage device with same function. In some embodiments, the memory 112 can store an original image database (not shown in figures), a morphed image database (not shown in figures), and the correspondence table generated. The original image database is configured to store the original images mentioned above, and the morphed image database is configured to store the morphed images mentioned above. In some embodiments, the morphed images in the morphed image database are configured to update (i.e., train) a recognition model IM executed by the processor 123.

In other words, the original images and the correspondence table will be pre-stored in the memory 112 and the memory 122. Therefore, the encryption and the decryption of data can be done in the following steps.

In some embodiments, the processor 113 and the processor 123 can be implemented by process units, central process units, or computing units. In some embodiments, the processor 123 can execute the recognition model IM with the corresponding software or firmware instruction process. It is noticed that, the structure and the update of the recognition model IM will be discussed in following paragraphs.

Figure 2:
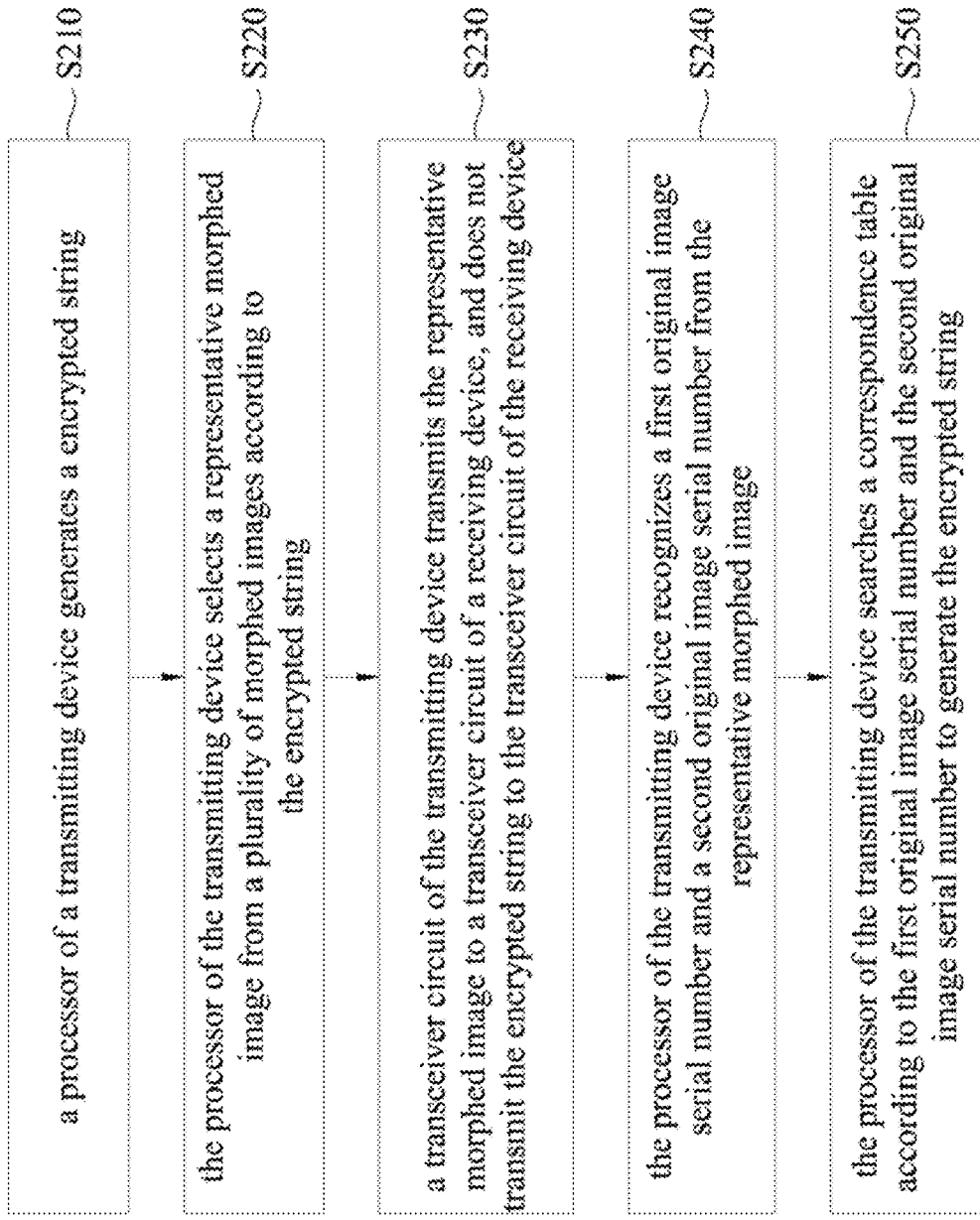
FIG. 2 is a flow diagram illustrating an encryption and decryption method according to the present disclosure.
Figure 3:
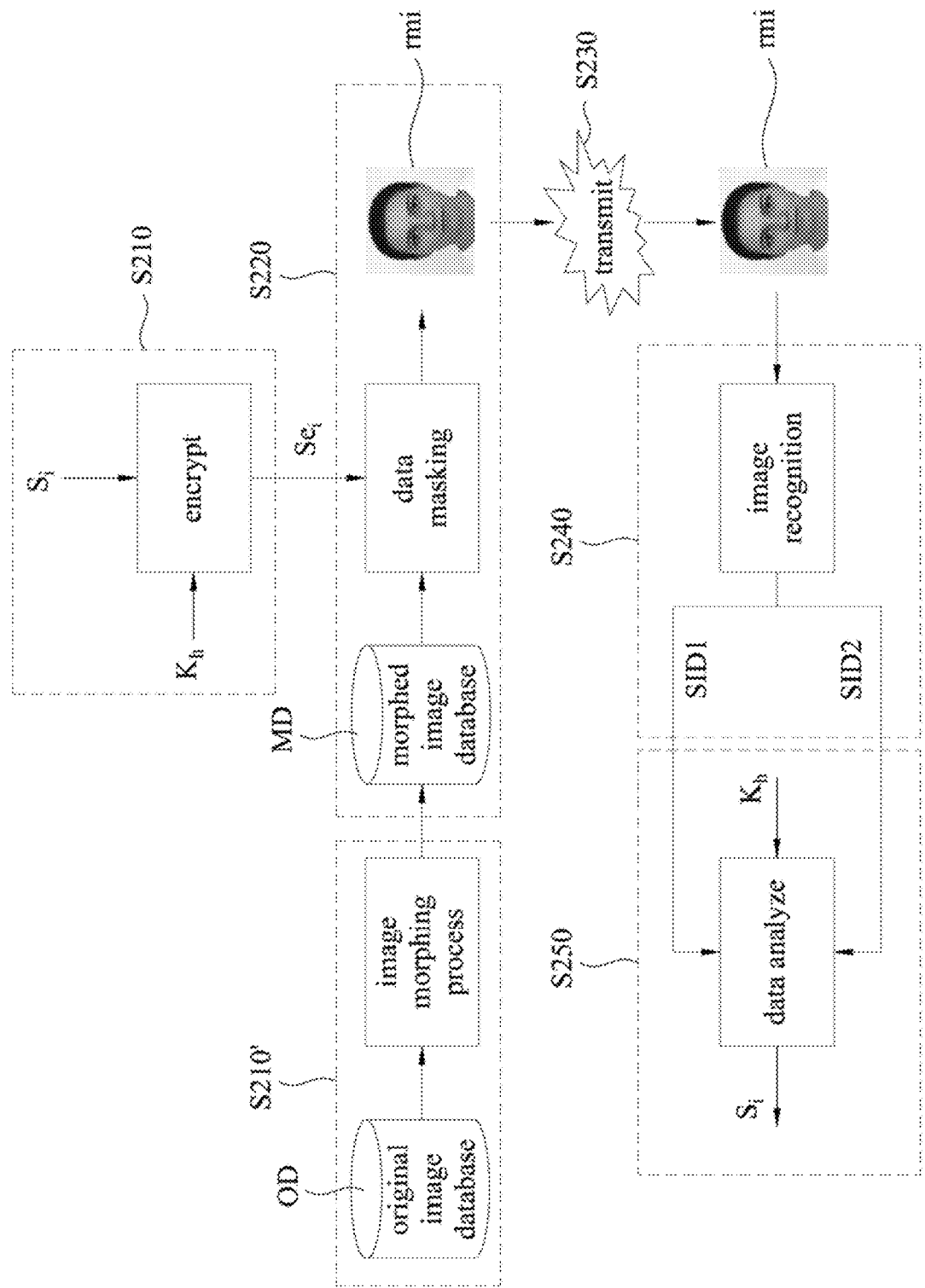
FIG. 3 is a schematic diagram illustrating the execution of the encryption and decryption system according to some embodiments of the present disclosure.

Reference is also made to FIG. 2 and FIG. 3. FIG. 2 is a flow diagram illustrating an encryption and decryption method 200 according to the present disclosure. FIG. 3 is a schematic diagram illustrating the execution of the encryption and decryption system 100 according to some embodiments of the present disclosure. The components of the encryption and decryption system 100, shown in FIG. 1, are configured to execute steps S210 to S250 of the encryption and decryption method 200. As shown in FIG. 2 and FIG. 3, first, in step S210, the processor 113 generates an encrypted string $se_i$. In some embodiments, the memory 112 and the memory 122 share a key $K_h$ (i.e., the memory 112 and the memory 122 store the same key $K_h$). In some embodiments, the processor 113 can perform an encryption algorithm on a data $S_i$ by using the key $K_h$ to generate the encrypted string $se_i$. In some embodiments, the processor 113 can perform an encryption algorithm on the data $S_i$ by using Advanced Encryption Standard (AES) or other conventional encryption algorithms.

In some embodiments, step S210' can be executed after step S210. In step S210', the processor 113 performs the image morphing process on the plurality of original images to generate the plurality of morphed images.

In some embodiments, the processor 113 can obtain the plurality of original images from an original image database OD, and perform the image morphing process on the plurality of original images to generate the plurality of morphed images. Next, the processor 113 can store the plurality of morphed images in a morphed image database MD, and record a correspondence between serial numbers of the plurality of original images and serial numbers of the plurality of morphed images in a correspondence table. It is noticed that, the above-mentioned "pairwisely" means randomly selecting twice from the plurality of original images before a morphed image has been generated, wherein the same original image of the plurality of original images can be selected twice.

In some embodiments, the number of the plurality of original images is N, the number of the plurality of morphed images is $C_2^{N+1}$, the serial numbers of the plurality of original images are decimal, the serial numbers of the plurality of morphed images are binary, and number of bits of the serial numbers of the plurality of morphed images is $\lceil \log_2 C_2^{N+1} \rceil$, wherein N can be any positive integer.

Figure 4:
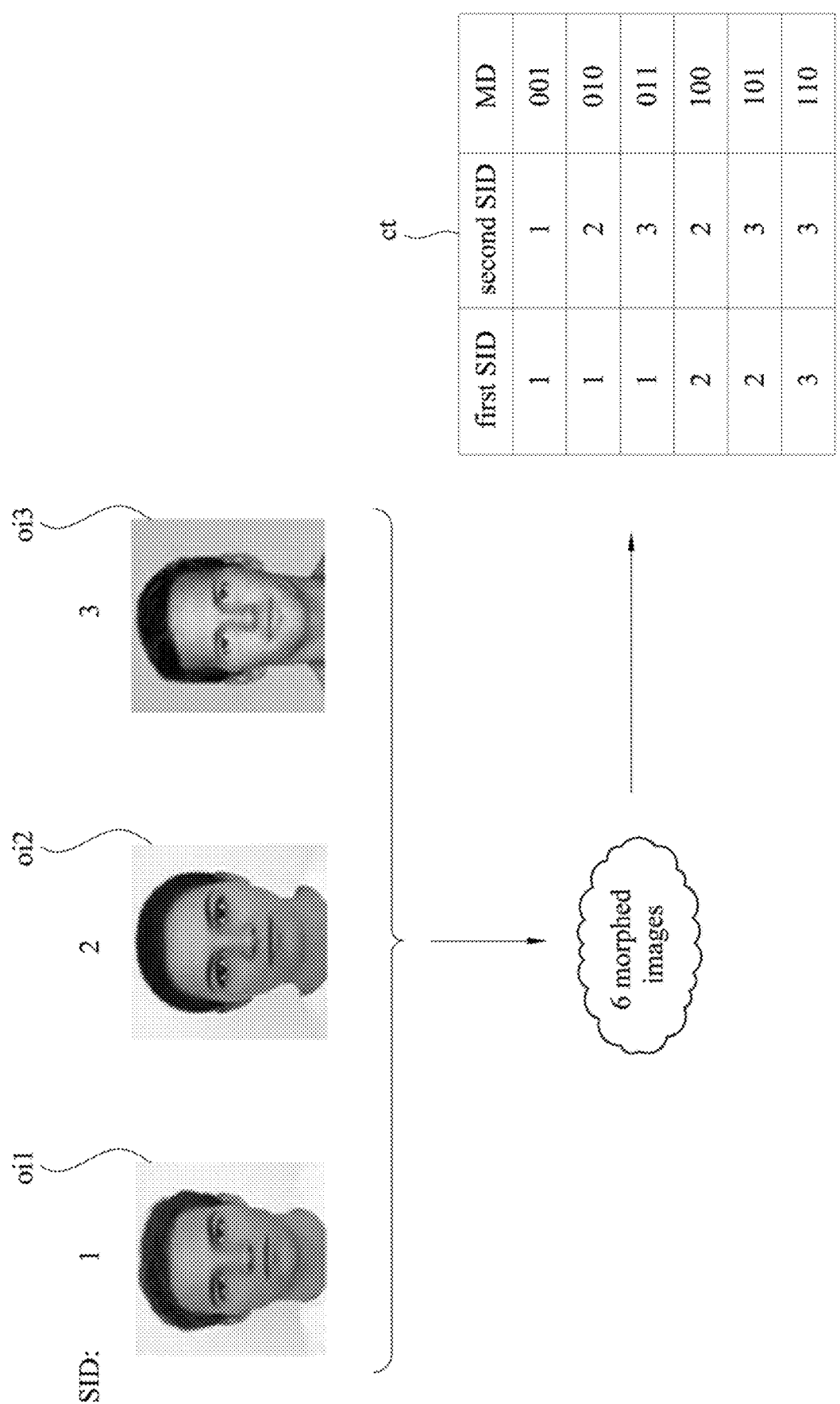
FIG. 4 is a schematic diagram illustrating a process of generating a correspondence table according to some embodiments of the present disclosure.

The generations of the plurality of morphed images and the correspondence table are illustrated by the example in the following paragraphs. Reference is also made to FIG. 4. FIG. 4 is a schematic diagram illustrating process of generating correspondence table ct according to some embodiments of the present disclosure. As shown in FIG. 4, assume that the original image database OD comprises 3 original images oi1, oi2, and oi3, the serial numbers SID of the original images oi1, oi2, and oi3 are 1, 2, and 3 respectively, the original images oi1, oi2, and oi3 can be selected repeatedly, and the encryption and decryption system 100 or the encryption and decryption method 200 can select twice from the original images oi1, oi2, and oi3. In this case, there are 6 selection combinations (e.g., a first serial number SID is 1 and a second serial number SID is 2) and 6 morphed images, and the number of bits of the serial numbers MID of the 6 morphed images is 3. Accordingly, serial number combinations of the original images can be set as binary serial numbers (e.g., 001-110) in an ascending order. Therefore, the correspondence between serial numbers of the plurality of original images and serial numbers MID of the plurality of morphed images can be recorded in the correspondence table ct.

Furthermore, as shown in the correspondence table ct, if the first serial number SID is 1 and the second serial number SID is 1 (i.e., the original image oi1 with serial number SID 1 is morphed with itself), the corresponding serial number MID of the morphed image is 001. In other words, the original image oi1 is morphed with the original image oi1, a morphed image is generated with a serial number MID 011. If the first serial number SID is 1 and the second serial number SID is 2 (i.e., the original image oi1 with serial number SID 1 is morphed with the original image oi2 with serial number SID 2), the corresponding serial number MID of the morphed image is 010. In other words, the original image oi1 is morphed by the image morphing process with the original image oi2, a morphed image is generated with a serial number MID 010. By analogy, the correspondence table ct can record all of the correspondence between the serial number combinations (the first serial number SID and the second serial number SID) and the serial numbers MID of the plurality of morphed images.

Figure 5:
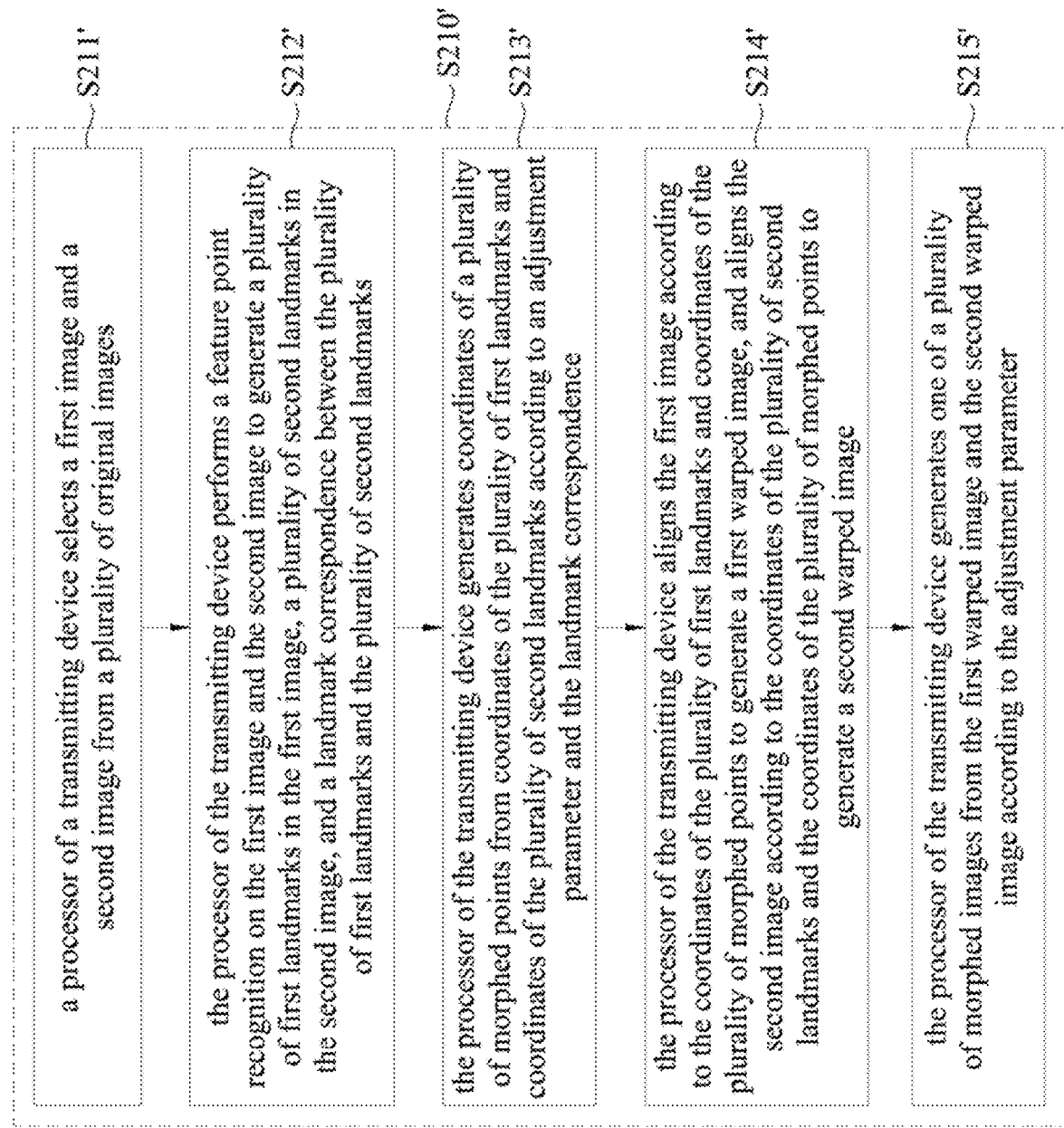
FIG. 5 is a flow diagram illustrating the detailed steps of a step shown in FIG. 3 according to some embodiments of the present disclosure.

The detailed steps of step S210' are further illustrated in the following paragraphs. Reference is also made to FIG. 5. FIG. 5 is a flow diagram illustrating the detailed steps of step S210' shown in FIG. 3, according to some embodiments of the present disclosure. As shown in FIG. 5, step S210' comprises steps S211'-S215'.

First, in step S211', the processor 113 selects a first image and a second image from the plurality of original images. In other words, the processor 113 selects 2 images from the original image database OD. It is noticed that, in this embodiment, the first image and the second image are different images, but in other embodiments, the first image and the second image can be the same image.

In step S212', the processor 113 performs a feature point recognition on the first image and the second image to generate a plurality of first landmarks in the first image, a plurality of second landmarks in the second image, and a landmark correspondence between the plurality of first landmarks and the plurality of second landmarks (i.e., each of the plurality of first landmarks corresponds to which of the plurality of second landmarks).

In some embodiments, the feature point recognition comprises a Supervised Descent Method (SDM) algorithm and an edge detection algorithm.

Figure 6:
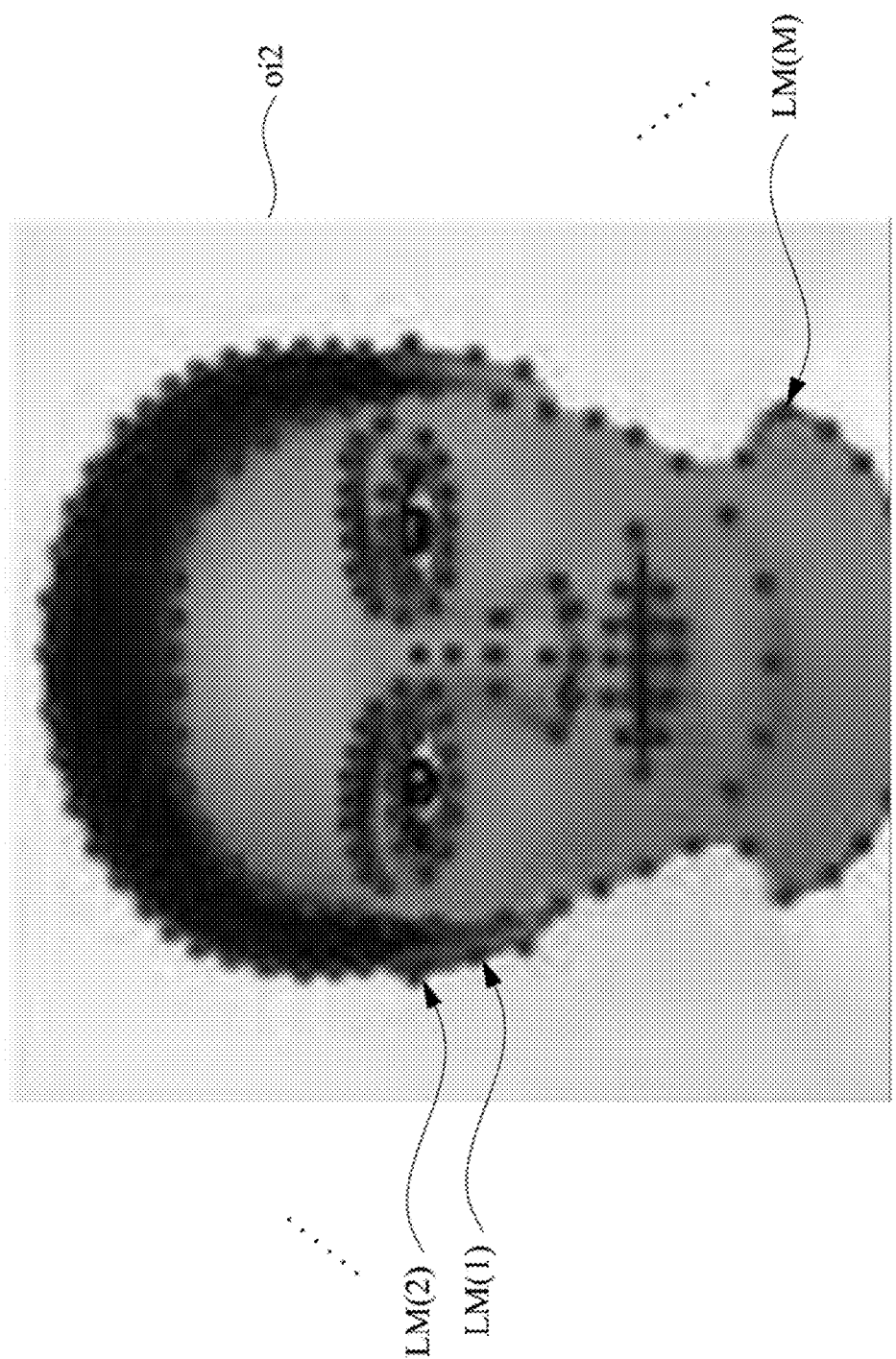
FIG. 6 is a schematic diagram illustrating landmarks according to some embodiments of the present disclosure.

Reference is also made to FIG. 6. FIG. 6 is a schematic diagram illustrating a plurality of landmarks LM(1)~LM(M) according to some embodiments of the present disclosure. As shown in FIG. 6, the plurality of landmarks LM(1)~LM(M) can be generated from the original image oi2, wherein M is the number of the plurality of landmarks LM(1)~LM(M) and also a positive integer. The plurality of landmarks LM(1)~LM(M) marks all of the feature points (e.g., facial features, hair, and the edge of the face) in the original image oi2. It is noticed that, the number of the plurality of landmarks LM(1)~LM(M) is fixed (e.g., there are 12 landmarks generated from an eye); thus, there is a correspondence between the plurality of landmarks LM(1)~LM(M) generated from different original images (e.g., landmarks generated from eyes in different original images correspond to each other).

As shown in FIG. 5, in step S213', the processor 113 generates coordinates of a plurality of morphed points from coordinates of the plurality of first landmarks and coordinates of the plurality of second landmarks according to an adjustment parameter and the correspondence between the plurality of the first landmarks and the plurality of second landmarks. In some embodiments, the coordinates of the plurality of morphed points can be calculated according to the following formula 1:

$$Cw = \alpha \times Cs + (1-\alpha) \times Ct, \quad \text{(formula 1)}$$

In the formula 1 above, Cw is a coordinate of a morphed point, Cs is a coordinate of a first landmark, Ct is a coordinate of a second landmark corresponding to Cs, and a is an adjustment parameter, wherein a has a value not less than 0 and also not greater than 1.

In step S214', the processor 113 performs an alignment process on the first image according to the coordinates of the plurality of first landmarks and coordinates of the plurality of morphed points to generate a first warped image, and performs the alignment process on the second image according to the coordinates of the plurality of second landmarks and the coordinates of the plurality of morphed points to generate a second warped image.

In some embodiments, the processor 113 can divide the first image into a plurality of first areas according to the coordinates of the plurality of first landmarks (e.g., a triangle first area is divided by 3 coordinates of the plurality of first landmarks), and divide the first image into a plurality of first morphed areas according to the coordinates of the plurality of morphed points (e.g., a triangle first morphed area is divided by 3 coordinates of the plurality of morphed points), thereby first distance differences between each of the plurality of first areas and the corresponding first morphed area are calculated (e.g., a distance difference between a centroid in a first area and a centroid in a corresponding first morphed area). After that, the processor 113 can adjust the positions of the plurality of first areas in the first image according to the first distance differences to generate the first warped image (i.e., the alignment process mentioned above).

In some embodiments, the processor 113 can divide the second image into a plurality of second areas according to the coordinates of the plurality of second landmarks (e.g., a triangle first area is divided by 3 coordinates of the plurality of second landmarks), and divide the second image into a plurality of second morphed areas according to the coordinates of the plurality of morphed points (e.g., a triangle second morphed area is divided by 3 coordinates of the plurality of morphed points), thereby second distance differences between each of the plurality of second areas and the corresponding second morphed area are calculated (e.g., a distance difference between a centroid in a first area and a centroid in a corresponding first morphed area). After that, the processor 113 can adjust the positions of the plurality of second areas in the second image according to the second distance differences to generate the second warped image.

In step S215', the processor 113 generates one of the plurality of morphed images from the first warped image and the second warped image according to the adjustment parameter.

In some embodiments, the processor 113 can overlay the first warped image and the second warped image, and adjust pixel values of the overlaid image by the adjustment parameter to generate a morphed image, thereby storing the morphed image in the morphed image database MD. In some embodiments, pixel values of the morphed image can be calculated according to the following formula 2:

$$Im(x,y) = \alpha \times Iws(x,y) + (1-\alpha) \times Iws(x,y), \quad \text{(formula 2)}$$

In the formula 2 above, x is a coordinate in the x direction, y is a coordinate in the y direction, Im (x,y) is a pixel value of the coordinate (x,y) in the morphed image, Iws(x,y) is a pixel value of the coordinate (x,y) in the first image, Iwt(x,y) is a pixel value of the coordinate (x,y) in the second image, and a is the adjustment parameter mentioned above.

The serial number of the first image and the serial number of the second image mentioned above is a serial number combination, and the encryption and decryption system 100 or the encryption and decryption method 200 can select another serial number combination to generate another morphed image according to the same adjustment parameter until no new serial number combination is generated.

The image morphing process in the above-mentioned embodiment is only an example of the present disclosure. In practice, the present disclosure can also perform the morphing process by using other conventional methods (e.g., image fusion algorithm) with no specific restrictions. Accordingly, massive morphed images can be generated from a few original images.

The effect of the adjustment parameter on the plurality of morphed images is illustrated by the example in the following paragraphs.

Figure 7:
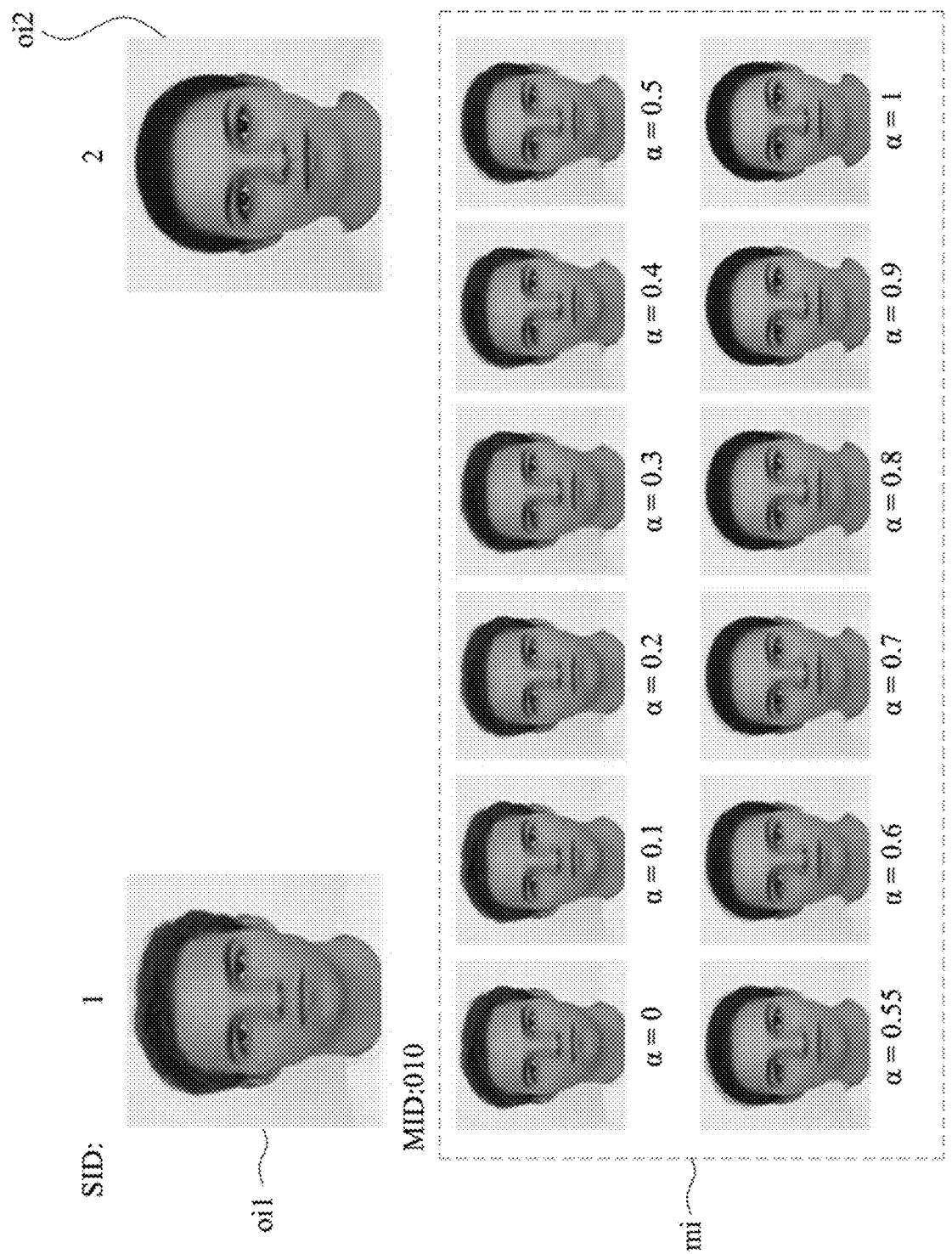
FIG. 7 is a schematic diagram illustrating the effects of adjustment parameters on morphed images according to some embodiments of the present disclosure.

Reference is also made to FIG. 7. FIG. 7 is a schematic diagram illustrating the effects of adjustment parameters α on morphed images mi according to some embodiments of the present disclosure. As shown in FIG. 7, first, the original images oi1 and oi2 are morphed by the image morphing process to generate the morphed images mi, wherein the serial number of the original image oi1 is 1, the serial number of the original image oi2 is 2, and the serial number of the morphed images mi is 010.

The corresponding morphed images mi generated with the adjustment parameters α from 0, 0.1, 0.2, to 1 are shown in FIG. 7. According to FIG. 7, it can be known that the adjustment parameters α will affect the morphed images mi. When the original images oi1 and oi2 are taken as the first image and the second image mentioned above, the lower the adjustment parameters α, the more similar the morphed images mi will be to the original image oi1, and the higher the adjustment parameters α, the more similar the morphed images mi will be to the original image oi2. Therefore, one of the adjustment parameters α can be selected to generate the morphed image database MD. In other words, the processor 113 will only select an adjustment parameter to generate all of the morphed images.

As shown in FIGS. 2 and 3, in step S220, the processor 113 selects the representative morphed image rmi from the plurality of morphed images according to the encrypted string se$_i$ (i.e., data masking). In some embodiments, the serial number of the representative morphed image rmi and the encrypted string se$_i$ are identical. For example, assume that the encrypted string se$_i$ is 010, the processor 113 selects a morphed image with serial number 010 from the morphed image database, and takes the morphed image as the representative morphed image rmi.

In step S230, the transceiver circuit 111 transmits the representative morphed image rmi to the transceiver circuit 121 and does not transmit the encrypted string se$_i$ to the transceiver circuit 121. In other words, the transceiver circuit 111 only transmits the representative morphed image rmi to the transceiver circuit 121 and does not transmit the encrypted string se$_i$ to the transceiver circuit 121.

In step S240, the processor 123 recognizes a first original image serial number SID1 and a second original image serial number SID2 from the representative morphed image rmi.

In some embodiments, the processor 123 recognizes the first original image serial number SID1 and the second original image serial number SID2 by using the recognition model IM. In some embodiments, the recognition model IM can be a morphed face recognition network version two (MFR-NET V2), and the morphed face recognition network version two comprises a feature extraction layer and two fully connected layers, wherein inputs of the two fully connected layers are connected to an output of the feature extraction layer, the feature extraction layer is a deep residual neural network (ResNet), and the fully connected layers are fully connected Lebesgue 2 normalization layers (FC L2 norm) (i.e., fully connected layers with L2 normalization layers). The morphed face recognition network version two in the above-mentioned embodiment is only an example of the present disclosure. In practice, the present disclosure can also use morphed face recognition network V1 (MFR-NET V1).

In some embodiments, the processor 123 can perform the image morphing process on a plurality of original images according to a plurality of adjustment parameters to generate a plurality of corresponding morphed images. The processor 123 can update the recognition model IM by using the plurality of corresponding morphed images and the plurality of original images to recognize the first original image serial number SID1 and the second original image serial number SID2 from the representative morphed image rmi by using the recognition model IM.

In some embodiments, the processor 123 can select the first image and the second image from the plurality of original images and perform the image morphing process on the first image and the second image according to the adjustment parameter to generate the corresponding morphed image. Next, the processor 123 can take the corresponding morphed image as a training sample, and take the first image and the second image as a first training label and a second training label. After that, the receiving device 120 inputs the training sample into the recognition model IM to generate a first prediction label and a second prediction label and performs an Additive Angular Margin Loss (ArcFace) calculation by using the first prediction label, the second prediction label, the first training label, and the second training label to generate a loss. After that, the processor 123 can perform a backpropagation process on the recognition model IM by using the loss to update the recognition model IM.

Besides, the serial number of the first image and the serial number of the second image mentioned above is a serial number combination, and the encryption and decryption system 100 or the encryption and decryption method 200 can select another serial number combination to update the recognition model IM until no new serial number combination is generated.

It is noticed that, the image morphing process in this embodiment and the image morphing process mentioned above is identical, hence, the detail process of the image morphing process in this embodiment will not be repeated for the purpose of simplicity and clarity. Also, in the training phase of the recognition model IM, a plurality of morphed image sets corresponding to a plurality of adjustment parameters (e.g., 0.1, 0.3, 0.5, 0.7, and 0.9) are generated relatively. Furthermore, for a first adjustment parameter, a first morphed image set can be generated with all of the serial number combinations, wherein the first morphed image set comprises a plurality of morphed images corresponding to the first adjustment parameter. For a second adjustment parameter, a second morphed image set can be generated with all of the serial number combinations, wherein the second morphed image set comprises a plurality of morphed images corresponding to the second adjustment parameter. By analogy, other morphed image sets can be generated by the same process.

The training phase of the recognition model IM is illustrated by the example in the following paragraphs.

Figure 8:
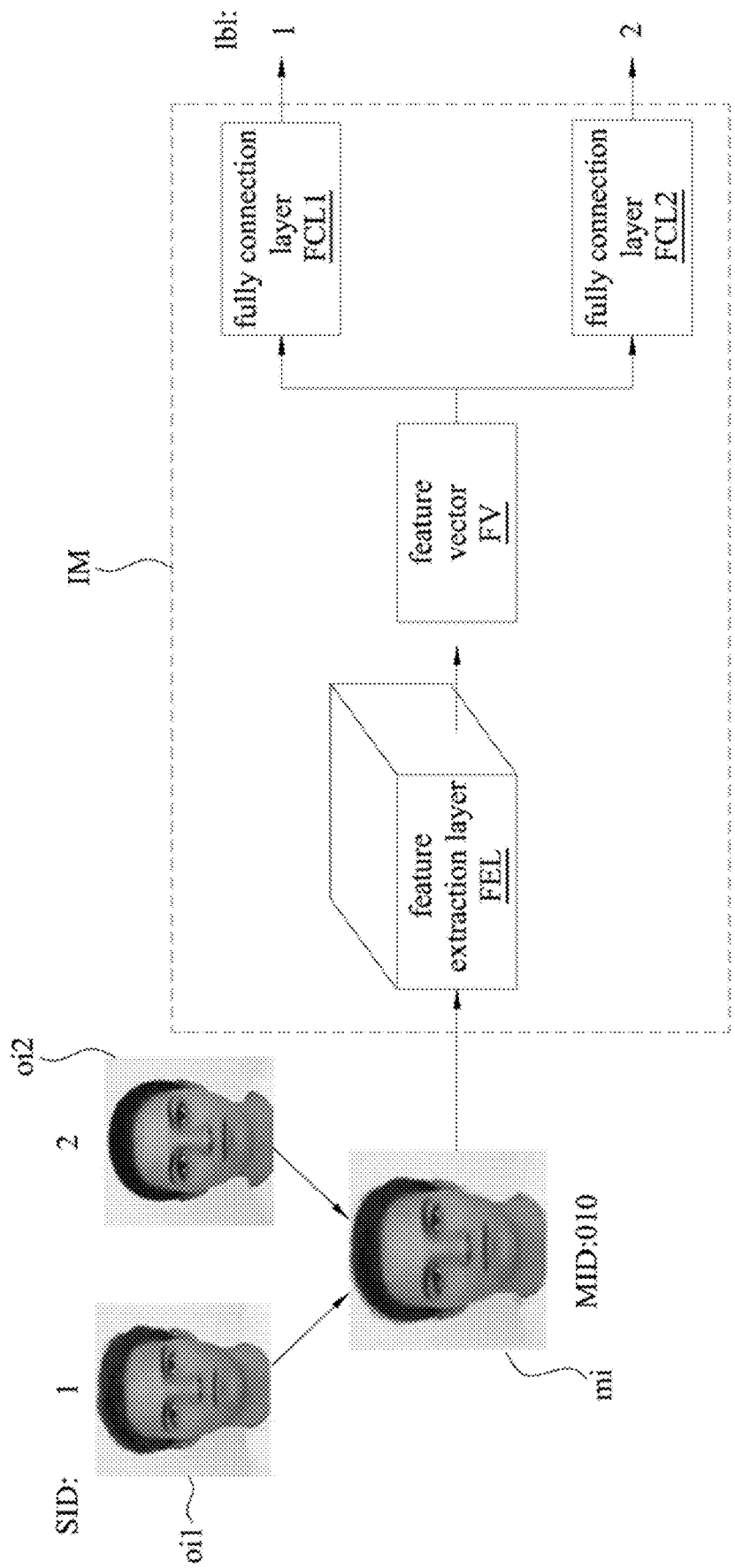
FIG. 8 is a schematic diagram illustrating the update of a recognition model according to some embodiments of the present disclosure.

Reference is also made to FIG. 8. FIG. 8 is a schematic diagram illustrating an update of the recognition model IM according to some embodiments of the present disclosure. As shown in FIG. 8, in this example, the original images oi1 corresponds to a serial number SID which is 1, the original images oi2 corresponds to a serial number SID which is 2, the morphed images mi corresponds to a serial number MID which is 010, and the adjustment parameter α is 0.1. The morphed images mi can be taken as a training sample, and the serial number SID (i.e., 1 and 2) can be taken as training labels Ibl. Next, the morphed images mi can be inputted into a feature extraction layer FEL to generate a feature vector FV, and the feature vector FV is inputted into fully connected layers FCL1 and FCL2 to generate 2 prediction labels, thereby an ArcFace calculation is performed by using the 2 prediction labels and the 2 training labels Ibl (i.e., 1 and 2) to generate a loss. After that, the backpropagation process can be performed on the fully connected layers FCL1 and FCL2 and the feature extraction layer FEL by using the loss to update parameters in the fully connected layers FCL1 and FCL2 and parameters in the feature extraction layer FEL.

As shown in FIGS. 2 and 3, in step S250, processor 123 looks up the correspondence table according to the first original image serial number SID1 and the second original image serial number SID2 to generate the encrypted string se$_i$ (i.e., data analysis).

Take the correspondence table ct shown in FIG. 4 as an example, and assume that the first original image serial number SID1 is 1, and the second original image serial number SID2 is 2. By looking up the correspondence table ct, the serial number of the corresponding morphed image can be known as 010. Accordingly, the encrypted string can be known as 010.

As shown in FIGS. 2 and 3, in some embodiments, in response to looking up the correspondence table ct according to the first original image serial number SID1 and the second original image serial number SID2 to generate the encrypted string se$_i$, the processor 123 can perform a decryption algorithm on the encrypted string se$_i$ by using a key K$_h$ to generate a data S$_i$. In the embodiments, the processor 123 can perform a decryption algorithm on the encrypted string se$_i$ by using Advanced Encryption Standard (AES) or other conventional encryption algorithms.

By the above-mentioned steps, different from conventional encryption and decryption methods, the present disclosure masks the data in the serial number of the morphed image and does not transmit the serial number of the morphed image. The receiver can find out the serial number of the morphed image through an image recognition process and by looking up the table, and the serial number of the morphed image can be taken as the original data transmitted by the transmitter.

In summary, the encryption and decryption method and system of the present disclosure can increase the number of morphed images, and pre-generate the correspondence table of the morphed images and the original images. Accordingly, the transmitter can mask the data in the serial number of the morphed image and does not transmit the serial number of the morphed image. Therefore, a cyber attacker cannot directly know where the data is masked. Also, the receiver can easily interpret the original data transmitted by the transmitter through the image recognition process and by looking up the table. Thus, the consumption of resources and time can be greatly reduced, problems of excessive image distortion or low capacity of embedded data can be solved, and the ability to recover the encrypted data can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An encryption and decryption system, comprising:
   a transmitting device, comprising:
   a first memory, configured to store a plurality of original images;
   a first processor, configured to perform an image morphing process on the plurality of original images pairwisely to generate a plurality of morphed images, and record a correspondence between serial numbers of the plurality of original images and serial numbers of the plurality of morphed images in a correspondence table stored in the first memory, wherein the first processor is configured to generate an encrypted string, and select a representative morphed image from the plurality of morphed images according to the encrypted string; and
   a first transceiver circuit, configured to transmit the representative morphed image and does not transmit the encrypted string; and
   a receiving device, connected to the transmitting device, comprising:
   a second memory, configured to store the correspondence table;
   a second transceiver circuit, configured to receive the representative morphed image from the first transceiver circuit and does not receive the encrypted string; and
   a second processor, configured to recognize a first original image serial number and a second original image serial number from the representative morphed image, and look up the correspondence table according to the first original image serial number and the second original image serial number to generate the encrypted string;
   wherein the first processor is further configured to:
   selecting a first image and a second image from the plurality of original images;
   performing a feature point recognition on the first image and the second image to generate a plurality of first landmarks in the first image and a plurality of second landmarks in the second image, and establishing a landmark correspondence between the plurality of first landmarks and the plurality of second landmarks;
   generating coordinates of a plurality of morphed points from coordinates of the plurality of first landmarks and coordinates of the plurality of second landmarks according to a first adjustment parameter and the landmark correspondence;

performing an alignment process on the first image according to the coordinates of the plurality of first landmarks and coordinates of the plurality of morphed points to generate a first warped image, and performing the alignment process on the second image according to the coordinates of the plurality of second landmarks and the coordinates of the plurality of morphed points to generate a second warped image; and transforming the first warped image and the second warped image into a first corresponding morphed image according to the first adjustment parameter.

2. The encryption and decryption system of claim 1, wherein the first memory and the second memory share a key;

the first processor is configured to perform an encryption algorithm on a data by using the key to generate the encrypted string; and in response to looking up the correspondence table according to the first original image serial number and the second original image serial number to generate the encrypted string, the second processor is configured to perform a decryption algorithm on the encrypted string by using the key to generate the data.

3. The encryption and decryption system of claim 1, wherein a serial number of the representative morphed image and the encrypted string are the same.

4. The encryption and decryption system of claim 1, wherein the first processor is further configured to:

recording the correspondence between the first image and the first corresponding morphed image and the correspondence between the second image and the first corresponding morphed image to the correspondence table.

5. The encryption and decryption system of claim 1, wherein the second processor is further configured to:

performing the image morphing process on the plurality of original images pairwisely according to a plurality of second adjustment parameters to generate a plurality of second corresponding morphed images; and updating a recognition model by using the plurality of second corresponding morphed images and the plurality of original images to recognize the first original image serial number and the second original image serial number by using the recognition model.

6. The encryption and decryption system of claim 1, wherein the second processor is further configured to:

selecting a third image and a fourth image from the plurality of original images, and performing the image morphing process on the third image and the fourth image according to a third adjustment parameter to generate a third corresponding morphed image;

taking the third corresponding morphed image as a training sample, and taking the third image and the fourth image as a first training label and a second training label;

inputting the training sample into a recognition model to generate a first prediction label and a second prediction label, and performing an ArcFace calculation by using the first prediction label, the second prediction label, the first training label, and the second training label to generate a loss; and performing a backpropagation process on the recognition model by using the loss to update the recognition model.

7. The encryption and decryption system of claim 6, wherein the recognition model is a morphed face recognition network version two; and the morphed face recognition network version two comprises a feature extraction layer and two fully connected layers, wherein inputs of the two fully connected layers are connected to an output of the feature extraction layer;

the feature extraction layer is a deep residual neural network; and the two fully connected layers are two fully connected Lebesgue 2 normalization layers.

8. The encryption and decryption system of claim 1, wherein number of the plurality of original images is N, number of the plurality of morphed images is $C_2^{N+1}$, and number of bits of the serial numbers of the plurality of morphed images is $\lceil \log_2 C_2^{N+1} \rceil$.

9. The encryption and decryption system of claim 1, wherein the serial numbers of the plurality of original images are decimal, and the serial numbers of the plurality of morphed images are binary.

10. An encryption and decryption method, comprising:

generating an encrypted string, performing an image morphing process on a plurality of original images pairwisely to generate a plurality of morphed images, and recording a correspondence between serial numbers of the plurality of original images and serial numbers of the plurality of morphed images in a correspondence table;

selecting a representative morphed image from the plurality of morphed images according to the encrypted string;

transmitting the representative morphed image and does not transmit the encrypted string;

in response to receiving the representative morphed image, recognizing a first original image serial number and a second original image serial number from the representative morphed image;

looking up the correspondence table according to the first original image serial number and the second original image serial number to generate the encrypted string;

selecting a first image and a second image from the plurality of original images;

performing a feature point recognition on the first image and the second image to generate a plurality of first landmarks in the first image and a plurality of second landmarks in the second image, and establishing a landmark correspondence between the plurality of first landmarks and the plurality of second landmarks;

generating coordinates of a plurality of morphed points from coordinates of the plurality of first landmarks and coordinates of the plurality of second landmarks according to an adjustment parameter and the landmark correspondence;

performing an alignment process on the first image according to the coordinates of the plurality of first landmarks and coordinates of the plurality of morphed points to generate a first warped image, and performing an alignment process on the second image according to the coordinates of the plurality of second landmarks and the coordinates of the plurality of morphed points to generate a second warped image; and transforming the first warped image and the second warped image into a corresponding morphed image according to the adjustment parameter.

11. The encryption and decryption method of claim 10, further comprising:
    performing an encryption algorithm on a data by using a shared key to generate the encrypted string; and
    in response to looking up the correspondence table according to the first original image serial number and the second original image serial number to generate the encrypted string, performing a decryption algorithm on the encrypted string by using the shared key to generate the data.

12. The encryption and decryption method of claim 10, wherein a serial number of the representative morphed image and the encrypted string are the same.

13. The encryption and decryption method of claim 10, further comprising:
    recording the correspondence between the first image and the first corresponding morphed image to the correspondence table; and
    recording the correspondence between the second image and the first corresponding morphed image to the correspondence table.

14. The encryption and decryption method of claim 10, further comprising:
    performing the image morphing process on the plurality of original images pairwisely according to a plurality of second adjustment parameters to generate a plurality of second corresponding morphed images; and
    updating a recognition model by using the plurality of second corresponding morphed images and the plurality of original images to recognize the first original image serial number and the second original image serial number by using the recognition model.

15. The encryption and decryption method of claim 10, further comprising:
    selecting a third image and a fourth image from the plurality of original images, and performing the image morphing process on the third image and the fourth image according to a third adjustment parameter to generate a third corresponding morphed image;
    taking the third corresponding morphed image as a training sample, and taking the third image and the fourth image as a first training label and a second training label;
    inputting the training sample into a recognition model to generate a first prediction label and a second prediction label, and performing an ArcFace calculation by using the first prediction label, the second prediction label, the first training label, and the second training label to generate a loss; and
    performing a backpropagation process on the recognition model by using the loss to update the recognition model.

16. The encryption and decryption method of claim 15, wherein
    the recognition model is a morphed face recognition network version two; and
    the morphed face recognition network version two comprises a feature extraction layer and two fully connected layers, wherein
        inputs of the two fully connected layers are connected to an output of the feature extraction layer;
        the feature extraction layer is a deep residual neural network; and
        the two fully connected layers are two fully connected Lebesgue 2 normalization layers.

17. The encryption and decryption method of claim 10, wherein number of the plurality of original images is N, number of the plurality of morphed images is $C_2^{N+1}$, and number of bits of the serial numbers of the plurality of morphed images is $\lceil \log_2 C_2^{N+1} \rceil$.

18. The encryption and decryption method of claim 10, wherein the serial numbers of the plurality of original images are decimal, and the serial numbers of the plurality of morphed images are binary.

* * * * *